Figure 1:
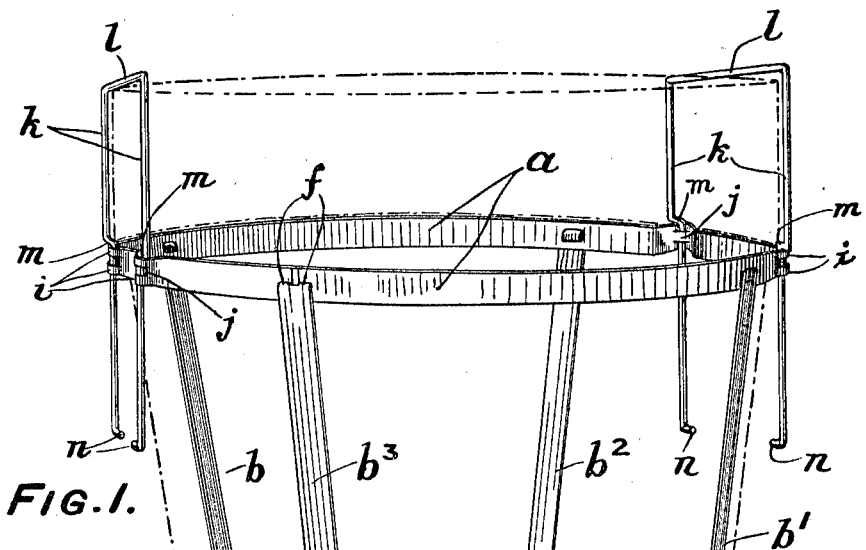

T. J. BROWNING.
FLOWER POT HOLDER.
APPLICATION FILED SEPT. 15, 1910.

999,202.

Patented Aug. 1, 1911.

WITNESSES:
Rob. R. Ketchel
E. E. Wall

INVENTOR
Tillie J. Browning
BY
Henderson & Harding
ATTORNEYS.

UNITED STATES PATENT OFFICE.

TILLIE J. BROWNING, OF PHILADELPHIA, PENNSYLVANIA.

FLOWER-POT HOLDER.

999,202.     Specification of Letters Patent.     Patented Aug. 1, 1911.

Application filed September 15, 1910. Serial No. 582,166.

*To all whom it may concern:*

Be it known that I, TILLIE J. BROWNING, a citizen of the United States, residing at Philadelphia, county of Philadelphia, and State of Pennsylvania, have invented a new and useful Improvement in Flower-Pot Holders, of which the following is a full, clear, and exact description, reference being had to the accompanying drawings, which form a part of this specification.

The object of my invention is to provide a skeleton cone pot holder, for flower pots, so constructed as to securely support the pot, and prevent it from accidentally breaking the jardinière when placing the pot therein.

Another object of the invention is to so construct the holder that when the pot is placed therein the pot is supported on the bottom and also on the entire side length of the holder owing to its cone shape.

Another object of the invention is to so construct the holder that when a pot is placed therein, the bottom of the pot is raised or elevated, above the bottom of the jardinière, and is also prevented from contacting with the earth when placed on the ground, thus preventing the ground worm from entering the potted plant from the drainage hole in the bottom of the pot. This has always been a serious drawback when in summer it is desirable to place the house plant on the ground.

Another object of my invention is to provide movable handles on either side of the pot holder for convenience in moving the pot about, the movable handles dropping down, so that the top of each handle is flush or slightly above the top of the pot, and can be extended above the top of the pot to enable one, in case of extra large and heavy plants, to grip the handle with a good firm hold. Therefore it is desirable owing to the extra size of these handles when extended, to provide a means of concealment, to hide the handles, as the plant and jardinière are for decorative purposes, and the protruding handles would be an undesirable feature, standing up above the pot line enough to move it around. Stationary handles can of course, be used to advantage on small size holders and at less cost in manufacturing.

The pot holder will minimize the breaking of jardinières by preventing the pot from slipping out of the fingers when placing it in the jardinière. This result is due to the fact that the pot and the jardinière are as a rule of about the same size in circumference at the top, and as the jardinière is usually deeper than the pot, there is not room enough for the fingers to hold on to the edge until the pot reaches the bottom; therefore the pot drops to the bottom of the jardinière and in most cases cracks or breaks its bottom.

Figure 2:
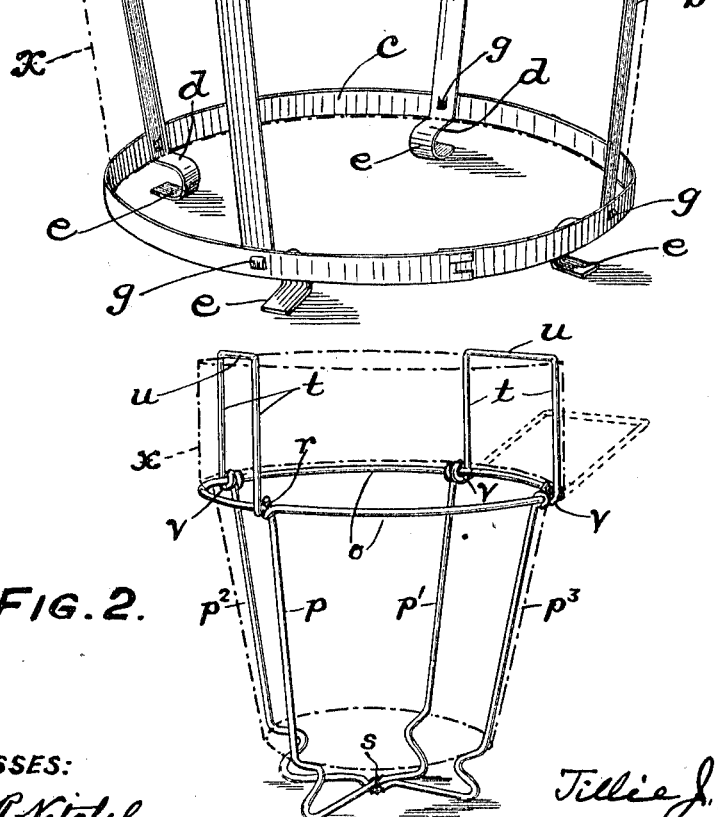

In the drawings, I have shown two embodiments of my invention, Figure 1 being a perspective view of one embodiment and Fig. 2, of the other embodiment.

I will first describe the form of my invention shown in Fig. 1. $a$ is the upper ring of the holder. $b$, $b^1$, $b^2$, $b^3$, represent upright strips or bars extending downward, and converging somewhat inward, from the upper ring $a$. $c$ is a lower ring secured to the strips near their lower ends. Each strip below its point of attachment to the lower ring $c$ is bent inward to form a rest $d$ for the bottom of the pot, and is thence bent downward and outward to form feet $e$ for supporting the holder. The strips may be attached to the rings in any convenient manner. I prefer to provide the upper ring $a$ with orifices into which the upper ends of the strips extend and are bent downward against the inner face of the ring. One of the strips, $b^3$, namely the one which engages the upper ring $a$ at the point where the opposite ends of the band forming the ring are abutted together, is cut away so as to form two flanges $f$ engaging respectively two orifices or slots in the respective abutting ends of the band forming the ring. The strips are attached to the lower ring $c$ by stamping out from the strips the projections $g$ and extending said projections through orifices in the lower ring.

The handles are movably secured to the upper ring $a$ by the following means: The upper ring $a$ is provided, on each side of the holder, with two outwardly-extending offsets $i$, and the metal of each offset is stamped out to form an eye $j$. Into each pair of eyes extend the two arms $k$ of one of the handles, said handle comprising said two arms and a connecting yoke $l$. Above the eyes the arms are bent to form offsets or shoulders $m$, by which the downward movement of the handles is limited.

As is well known, flower pots are made of standard sizes, and my improved holder is also intended to be made in different sizes to correspond with the standard sizes of pots. When an ordinary flower pot is deposited in a holder of proper size, the bottom of the pot (shown in dotted lines and lettered $x$) rests upon the rest $d$ of the holder, while the outwardly projecting ledge at the top of the holder rests upon the upper ring $a$ of the holder. The arms of the handles are capable of moving up and down in the eyes. Normally the handles are in their lowermost positions so that they lie flat against the outer wall of the pot, and so that the yokes $l$ extend just to the top edge of the pot to permit it to be grasped when it is desired to raise the handles. When it is desired to lift the pot, the handles are moved up (the arms $k$ sliding in the eyes $i$) until their further movement is limited by the extensions $n$ at the lower ends of the legs. The tops of the handles then extend substantially above the top of the pot and may be grasped by the user, and the holder with its contained pot may thus be lifted and carried from place to place.

One special feature characterizing my holder is that when deposited in a jardinière the bottom of the pot will be substantially above the bottom of the jardinière, thereby permitting any excess water in the pot to percolate through the hole in the bottom of the pot and drop onto the bottom of the jardinière. Many potted plants are ruined by being excessively watered, the excess of water incapable of being absorbed by the dirt settling into the bottom of the pot and becoming foul. This is impossible when the pot is held in my holder, inasmuch as any excess water in the bottom of the pot will, as stated, drain into the space below the bottom of the pot.

The form of my invention shown in Fig. 2 differs from the form hereinbefore described in that it is adapted to be made of wire, and is therefore cheaper to construct than the holder first described. The said modified form of holder comprises a ring $o$, bars $p$, $p^1$, $p^2$, $p^3$ and handles. Each of the bars extends downward and somewhat inward, being near its lower end bent inward to form a shoulder or rest for the bottom of the pot, and thence, to form the supporting feet, bent outward and downward and thence inward and somewhat upward to the vertical center line of the holder. Preferably I construct the ring $o$ and its supporting bars of two wires, one wire being bent to form an eye $r$, at one end, thence extending around the holder to form the ring $o$, thence extending through the eye $r$ and downward to form the bar $p$ and the corresponding rest and foot, thence extending across to the other side of the holder and bent around to form another foot and rest, thence extending up to the ring $o$ to form the leg $p^1$ and at its end bent around into engagement with the ring $o$. The other wire forms the two bars $p^2$ and $p^3$ and their respective rests and feet, the latter being connected together at the bottom, and the bars being at their upper ends bent around into engagement with the ring $o$. The two intersecting wires at the center of the bottom of the holder are secured together by tie-wires $s$. Each handle consists of arms $t$ and an extending yoke $u$, said arms at their lower ends being bent to form eyes $v$ engaging the ring. Thereby the handles are pivotally supported on the ring so that normally the handles may be swung inward on their pivots against the wall of the pot, while they may be swung out so that the yokes are at a substantial distance from the outer wall of the pot to permit them to be grasped by the hand for the purpose of lifting the holder and pot and carrying it from place to place.

Having now fully described my invention, what I claim and desire to protect by Letters Patent is:

1. A holder for flower pots consisting of a frame comprising a ring, converging bars depending therefrom, rests for the pot bottom near the lower end of the holder, and supporting feet below said rests; and movable handles each comprising an upper yoke and arms depending therefrom movably engaging the frame to permit said yoke to be moved toward and from the body of the pot.

2. A holder for flower pots consisting of a frame comprising a ring, converging bars depending therefrom, rests for the pot bottom near the lower end of the holder, and supporting feet below said rests; and movable handles each comprising an upper yoke and arms depending therefrom, and means permitting said handle to slide vertically upon the frame and limiting the extent of its upward movement.

In testimony of which invention, I have hereunto set my hand, at Philadelphia, on this 7th day of September, 1910.

TILLIE J. BROWNING.

Witnesses:
M. M. HAMILTON,
E. E. WALL.

---

Copies of this patent may be obtained for five cents each, by addressing the "Commissioner of Patents, Washington, D. C."